(No Model.)
A. K. OWEN.
STEP FOR VEHICLES.
No. 255,327. Patented Mar. 21, 1882.
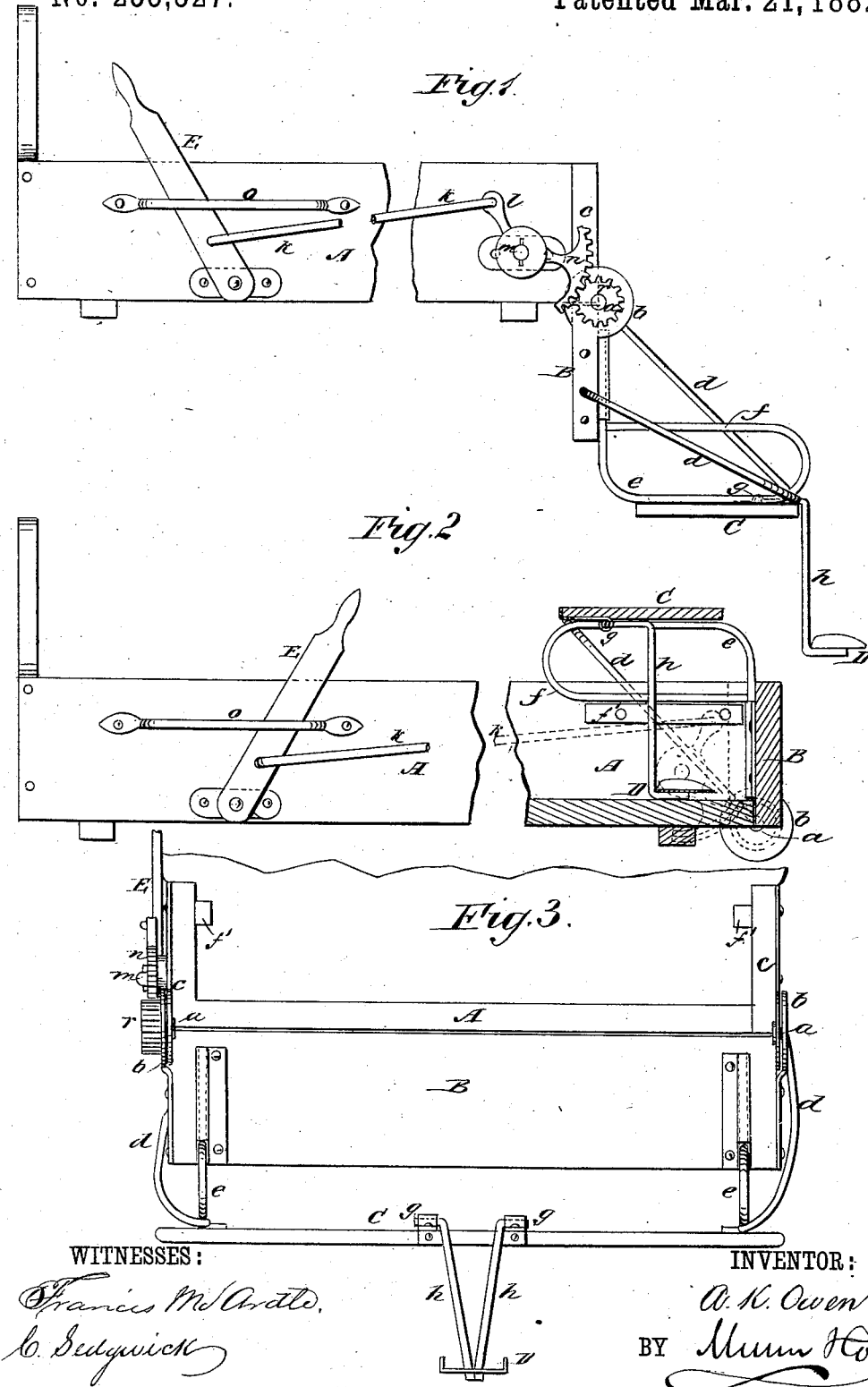
WITNESSES:
Francis McArdle
C. Sedgwick
INVENTOR:
A. K. Owen
BY Munn & Co
ATTORNEYS.

UNITED STATES PATENT OFFICE.

ASA KENTON OWEN, OF TENNESSEE, ILLINOIS.

STEP FOR VEHICLES.

SPECIFICATION forming part of Letters Patent No. 255,327, dated March 21, 1882.

Application filed January 5, 1882. (No model.)

*To all whom it may concern:*

Be it known that I, ASA K. OWEN, of Tennessee, in the county of McDonough and State of Illinois, have invented certain new and useful Improvements in Seats, End-Gates, and Steps of Wagons and other Vehicles, of which the following is a full, clear, and exact description.

This invention more particularly relates to street or road vehicles, of various kinds, suitable for carrying passengers or passengers and goods; and it consists in a combined seat, end-gate, and step, and in certain combinations of these devices, and in means for shifting them, if desired, by the driver on his seat, whereby increased facility and safety are afforded for getting in and out of the vehicle. Persons using the vehicle are less liable to be soiled by mud, the end-gate is more easily opened and closed, and said devices, if operated by the driver on his seat, can be manipulated by him without releasing hold of the horses. For old and infirm people or children the invention will be found an exceedingly convenient one.

Reference is to be had to the accompanying drawings, forming part of this specification, in which similar letters of reference indicate corresponding parts in all the figures.

Figure 1 represents a side view of the body of a wagon with my invention applied, and showing the seat, end-gate, and step in position for persons entering the wagon. Fig. 2 is a partly-sectional side view of the same, but exhibiting the seat, end-gate, and step as closed to their places in the wagon; and Fig. 3 is rear view, with the seat, end-gate, and step in the same positions which they occupy in Fig. 1.

A is the body of a wagon or other vehicle, provided with an end-gate, B, which is pivoted at its lower edge on pins $a\ a$, fixed in disks $b\ b$ to straps $c\ c$, fast on the rear portions of the sides of the body, so that said end-gate opens downward and may be restrained from moving back beyond a vertical position when opened by its lower edge bearing up against the under side of the wagon-body, or by the hinge itself when a "stop-lock" hinge is used, or it may be otherwise restrained.

C is a seat, of any desired kind, connected with the gate B at right angles to the latter transversely, but parallel with it longitudinally, and at a suitable distance apart, by means of end rods or frames $d\ e f$, so that in opening or closing the gate B the seat C, which has the same centers of motion, $a\ a$, as the gate B, moves with it, and so that when the gate is thrown down or open, as shown in Figs. 1 and 3, the seat occupies the position of a step and may be used as one for getting into or out of the wagon, or it may be used in such position for sitting on; but it is when the gate is closed, as shown in Fig. 2, that the seat C assumes its proper position for sitting purposes. When in this latter position, Fig. 2, the portions $ff$ of the rods or frames rest upon cleats $f'\ f'$ on the interior of the sides of the wagon body to support the seat, which then has its top side uppermost, and forms a back seat in advance of the end-gate.

Hinged or pivoted, as at $g\ g$, to the under side of the swinging seat C by an angularly-bent arm or leg, $h\ h$, is a central or lower step, D. This step, when the seat is closed or thrown forward, as shown in Fig. 2, bears upon the bottom of the wagon-body, and in connection with the arm or leg $h\ h$, which may be formed of two bars or rods, assists in supporting the seat intermediately of the end-supporting cleats $f'\ f'$, but which step, when the seat C is thrown back, may be turned down over the edge of said seat into moderate or close proximity with the ground, as shown in Figs. 1 and 3. In both of these positions of the step D the angularly-bent arm or leg $h\ h$ bears at its bent portion nearest the pivots $g\ g$ on or against the step C to hold said step in place, as shown in Figs. 1 and 2, said bent portion lapping over the edge of the seat when the step D is lowered. When it is desired to raise and throw forward the seat C the step D is first inverted by turning up the leg or arm $h\ h$ till the opposite side of its bent portion having the pivots $g\ g$ rests on the under side of the seat, which side then is uppermost. The gate B is then closed, and the seat C, by the same action, is thrown up and forward. This brings the step D and its arm or leg $h\ h$ into their supporting position of the seat on the bottom of the wagon-body.

If desired, the step D, which may be regarded as a supplementary one, may be altogether dispensed with, or the end-gate B might be omitted, and the seat C, with or without the attached step D, be hinged or pivoted at $a\ a$, as it virtually is, with the end-gate attached, to the sides of the wagon-body for operation as herein previously described; but it is preferred to combine the end-gate B, seat C, and supplementary step D as represented in the drawings, and so that the opening or closing of the gate throws the seat down and back or up and forward, as described.

The opening or closing of the gate B and backward or forward adjustment and reversal of the seat C may be effected directly by applying the hand to either of said parts, or it may be done by a short lever-and-cam motion or other mechanism, and it will be found generally desirable to employ means for the purpose within reach and subject to the control of the driver while on his seat and without releasing hold of his horses. The drawings represent means which may be thus manipulated by the driver, the same consisting of a hand-lever, E, within a keeper, $o$, and fulcrumed on one side of the wagon-body within reach of the driver, and having attached to it a rod, $k$, that is arranged along the side of said body and is attached at its back end to a crank or arm, $l$, on the shaft $m$ of which is also fixed a toothed sector, $n$, that engages with a pinion, $r$, on the gate B at its center of motion, $a$. By these means accordingly as the lever E is moved forward or backward will the gate B and seat C be adjusted to their respective positions, as shown in Figs. 1 and 2. Any suitable locking device may be applied to the lever E or other suitable part, if necessary, to hold the gate closed and the seat C in its raised and forward position.

The step D may be so inclined, set, or loaded as to cause it to take its proper place without being moved by the hands.

Having thus fully described my invention, I claim as new and desire to secure by Letters Patent—

1. The combination, with the body of a wagon or other vehicle and the end-gate B, hinged thereto, of the seat C and the frames $d\ e\ f$, substantially as shown and described, whereby the seat is connected to the end-gate and adapted to be moved with the end-gate to form a seat or step, as set forth.

2. The combination, with the swinging seat C, connected with the lower rear end portion of the body of the vehicle to admit of its being inverted and turned down and back to form a step, of the supplementary step D, hinged or pivoted to said seat, essentially as herein set forth.

3. The rods or frames $e\ f$, in combination with the swinging seat C, made convertible into a step, as described, the cleats or projections $f'\ f'$, for supporting the ends of the seat, and the supplementary step D, hinged or pivoted to the seat, and serving as an intermediate support to it, substantially as described.

4. The combination, with the body A of the vehicle, of the end-gate B, pivoted below to said body, the seat C, arranged at right angles in transverse relation to said gate, but parallel with it longitudinally, and connected with the gate so as to work from the same centers of motion, $a\ a$, and the supplementary step D, hinged or pivoted by a bent arm or leg, $h\ h$, to the seat for operation in relation with each other and with the body of the wagon, substantially as specified.

5. The combination of lever E, rod $k$, arm $l$, toothed sector $n$, and the pinion $r$, fixed to gate B, substantially as herein shown and described, whereby the step C and end-gate are operated by the driver from his seat, as set forth.

ASA KENTON OWEN.

Witnesses:
W. R. PITTMAN,
E. D. GREEN.